No. 620,876.  
R. V. BARRY.  
AUTOMATIC CORN PLANTER.  
(Application filed July 6, 1898.)  
Patented Mar. 14, 1899.

(No Model.)

Witnesses:  
Jas Barels.  
Thomas G. Orwig.

Inventor:  
Richard V. Barry

UNITED STATES PATENT OFFICE.

RICHARD V. BARRY, OF STUART, IOWA.

AUTOMATIC CORN-PLANTER.

SPECIFICATION forming part of Letters Patent No. 620,876, dated March 14, 1899.

Application filed July 6, 1898. Serial No. 685,287. (No model.)

*To all whom it may concern:*

Be it known that I, RICHARD V. BARRY, a citizen of the United States, residing at Stuart, in the county of Guthrie and State of Iowa, have invented a new and useful Improvement in Automatic Corn-Planters, of which the following is a specification.

This invention relates to improvements for the apparatus illustrated and described in my application for Letters Patent of the United States for automatic check-row corn-planters, issued January 11, 1898, No. 597,193.

The object of this invention is to provide improved means for dropping predetermined quantities of seed at predetermined times and at predetermined regular intervals from the seedbox into the standard of a runner of a corn-planter.

This invention consists in the construction, arrangement, and combination of elements hereinafter set forth, pointed out in my claims, and illustrated by the accompanying drawings, in which—

Figure 1:
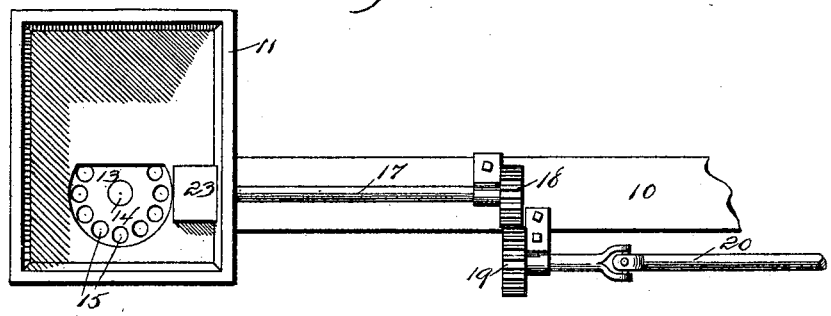
Figure 2:
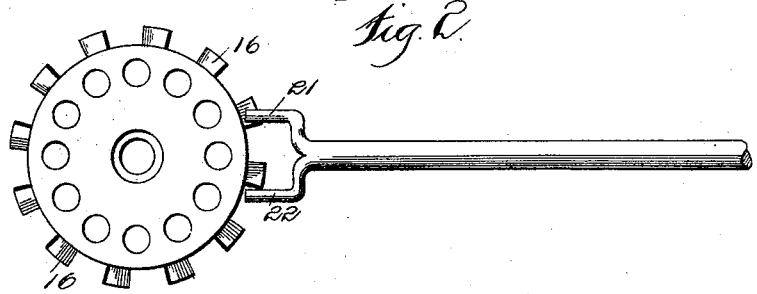
Figure 3:
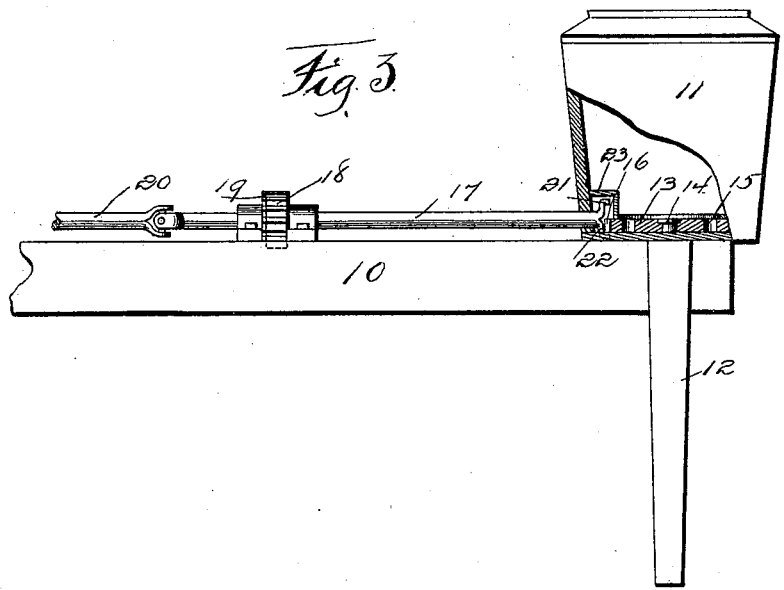

Figure 1 is a plan of the complete device and such parts of a corn-planter as are necessary for an understanding of the invention. Fig. 2 is a plan of the dropping-valve and operating-shaft detached from the remainder of the mechanism. Fig. 3 is a rear elevation, partly in section, illustrating the location of the several parts relative to each other.

In the construction of the device as shown the numeral 10 designates a supporting-bar on which is mounted a seedbox 11. The bottom of the seedbox is apertured, and a standard 12 depends therefrom and is provided with an open upper end registering with the aperture in the bottom of the box. A dropping-valve 13, of disk form, is pivoted on a pin 14, seated in the bottom of the seedbox, and rests upon said bottom. The valve 13 is provided with a plurality of seed-ports 15, arranged in a row concentric with the axis of the valve and so positioned that in the revolution of the valve the seed-ports will register successively with the aperture in the bottom of the seedbox. The disk dropping-valve 13 is provided with a series of radially-projecting teeth 16 on its periphery corresponding in number with the seed-ports in the valve, which teeth are beveled on their forward edges and provided with perpendicular plane faces on their rear edges. A shaft 17 is mounted for revolution in bearings mounted on the bar 10 and is geared by a pinion 18 to a pinion 19 of a drive-shaft 20, which drive-shaft may be operated by gearing to traction mechanism (not shown) or by a check-wire. (Not shown.) The shaft 17 is provided with a fork or bifurcation forming two arms 21 22 on each end portion, one end portion of the shaft only being shown. The arms 21 22 of the bifurcated end portion of the shaft 17 extend within the seedbox 11 and are protected from engagement by the seed within the box by means of a casing or partition 23.

In the rotation of the shaft 17 the arms 21 22 on the end thereof successively engage successive teeth on the disk dropping-valve and intermittently and progressively revolve said valve. The seed-corn falls into the seed-ports of the dropping-valve and is carried thereby upon the bottom of the seedbox 11 until such time as the ports successively register with the aperture in the bottom of the seedbox, at which time seeds drop from the port into the standard of the runner and are deposited by any desirable means (not shown) from the runner or standard to the earth.

A plate is mounted above the dropping-valve 13 in the seedbox 11 and is apertured to permit the passage of the seed-corn from the box into the seed-ports successively.

I claim as my invention—

1. In a corn-planter a disk dropping-valve provided with radial teeth, a shaft mounted for rotation, and arms on said shaft alternately engaging successively alternate teeth on the valve.

2. In a corn-planter the seedbox and runner-standard, communications between the same; a disk dropping-valve provided with seed-ports arranged to register successively with the seedbox and the communications between the box and the runner-standard, radial teeth on the dropping-valve, a shaft mounted for rotation and arms on said shaft arranged alternately to engage successively-alternating teeth of the valve.

3. In a corn-planter a dropping-valve provided with teeth and a shaft mounted for rotation and bifucated in its end portion the arms of the bifurcation of the shaft alternately successively engaging alternate teeth of the valve.

RICHARD V. BARRY.

Witnesses:
JAS. BARELS,
THOMAS G. ORWIG.